(12) United States Patent
Rocznik et al.

(10) Patent No.: US 11,209,929 B2
(45) Date of Patent: Dec. 28, 2021

(54) FAULTY PRESSURE SENSOR DETERMINATION OF A PORTABLE COMMUNICATION DEVICE TOUCH DISPLAY

(71) Applicant: Robert Bosch GmbH, Stuttgart (DE)

(72) Inventors: Thomas Rocznik, Mountain View, CA (US); Christian Peters, Mountain View, CA (US); Seow Yuen Yee, Mountain View, CA (US); Ning Wang, Sunnyvale, CA (US); Gary Yama, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/792,715

(22) Filed: Feb. 17, 2020

(65) Prior Publication Data

US 2021/0255751 A1    Aug. 19, 2021

(51) Int. Cl.
  *G06F 3/041*    (2006.01)
  *G01L 5/22*    (2006.01)
  *G06F 3/01*    (2006.01)

(52) U.S. Cl.
  CPC .......... *G06F 3/04144* (2019.05); *G01L 5/22* (2013.01); *G06F 3/016* (2013.01); *G06F 3/0416* (2013.01); *G06F 2203/04105* (2013.01)

(58) Field of Classification Search
  CPC .... G06F 3/04144; G06F 3/016; G06F 3/0416; G06F 2203/04105; G01L 5/22
  See application file for complete search history.

(56) References Cited

U.S. PATENT DOCUMENTS

| 9,417,696 | B2 | 8/2016 | DeLuca |
| 9,524,030 | B2 | 12/2016 | Modarres |
| 2009/0167722 | A1 | 7/2009 | Villain |
| 2016/0063828 | A1* | 3/2016 | Moussette ............ G06F 3/0416 340/540 |
| 2018/0004293 | A1 | 1/2018 | Bella et al. |
| 2019/0212861 | A1 | 7/2019 | Monson et al. |
| 2019/0332196 | A1* | 10/2019 | Weins ................... G06F 3/0416 |
| 2019/0094967 | A1 | 12/2019 | Bisbee et al. |

* cited by examiner

*Primary Examiner* — Kenneth B Lee, Jr.
(74) *Attorney, Agent, or Firm* — Michael Best & Friedrich LLP

(57) ABSTRACT

A portable electronic communication device including a display, a pressure sensor array including a plurality of pressure sensors, and an electronic processor communicatively coupled to the pressure sensor array. The electronic processor is configured to receive, from the pressure sensor array, a plurality of stress tensor measurements corresponding to a user interaction with the display, perform an interpolation of the plurality of pressure measurements, and determine, based on the interpolation, a faulty sensor of the plurality of sensors.

15 Claims, 4 Drawing Sheets

FAULTY PRESSURE SENSOR DETERMINATION OF A PORTABLE COMMUNICATION DEVICE TOUCH DISPLAY

BACKGROUND OF THE INVENTION

Some electronic communications devices, for example, mobile telephones and smart watches, include one or more pushbuttons for user interaction. Pushbuttons and similar components have several drawbacks including, for example, design limitations due to the mechanical presets of the buttons, milling and/or drilling of the frame of the communication device to accommodate such buttons, and the like.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
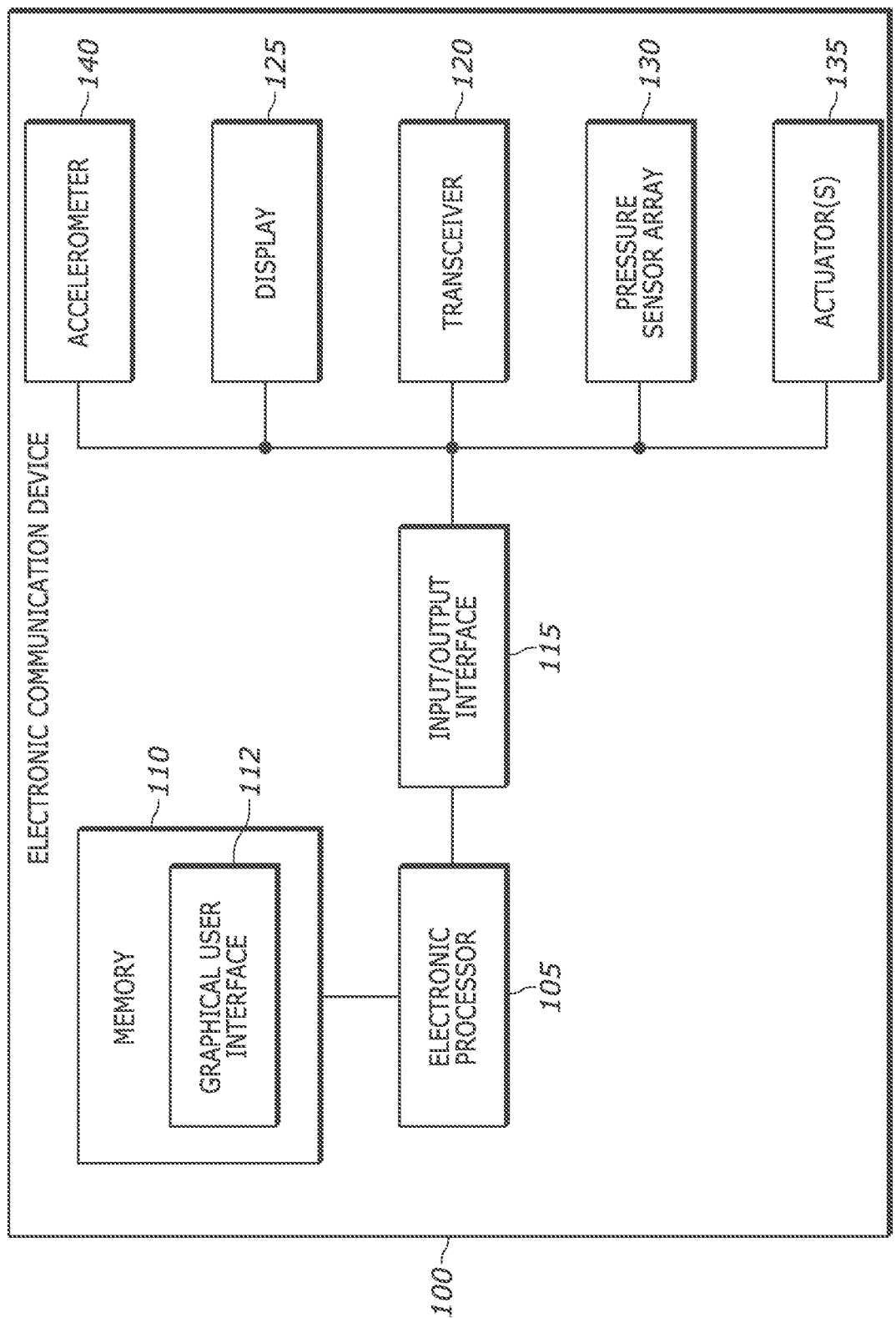
FIG. 1 is a diagram of the electronic communication device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Instead of pushbuttons, it may be more desirable to provide a graphical user interface on a touchscreen display in an electronic communication device. Embodiments presented herein provide, among other things, improved input detection on a touchscreen display of an electronic communication device.

One example embodiment provides a portable electronic communication device. The portable electronic communication device includes a display, a pressure sensor array including a plurality of pressure sensors, and an electronic processor communicatively coupled to the pressure sensor array. The electronic processor is configured to receive, from the pressure sensor array, a plurality of stress tensor measurements corresponding to a user interaction with the display, perform an interpolation of the plurality of pressure measurements, and determine, based on the interpolation, a faulty sensor of the plurality of sensors.

Another example embodiment provides a method for determining a faulty sensor of a plurality of pressure sensors of a pressure sensor array. The method includes receiving, from a pressure sensor array, a plurality of stress tensor measurements corresponding to a pressure interaction with a display, performing an interpolation of the plurality of pressure measurements, and determining, based on the interpolation, a faulty sensor of the plurality of sensors.

Another example embodiment provides a portable electronic communication system. The portable electronic communication system includes a display, a pressure sensor array including a plurality of pressure sensors, and an electronic processor communicatively coupled to the pressure sensor array. The electronic processor is configured to receive, from the pressure sensor array, a plurality of stress tensor measurements corresponding to a user interaction with the display, perform an interpolation of the plurality of pressure measurements, and determine, based on the interpolation, a faulty sensor of the plurality of sensors.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 is a diagram of an example of a portable electronic communications device 100. In the embodiment illustrated, the electronic communications device 100 includes an electronic processor 105, a memory 110, an input/output interface 115, a transceiver 120, a touch screen display 125, and a pressure sensor array 130. In some embodiments, the electronic communications device 100 also includes an actuator 135 and/or an accelerometer 140. In some embodiments, more than one actuator and/or accelerometer are used. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein.

The electronic processor 105 obtains and provides information (for example, from the memory 110 and/or the input/output interface 115), and processes the information by executing one or more software instructions or modules, capable of being stored, for example, in a random access memory ("RAM") area of the memory 110 or a read only memory ("ROM") of the memory 110 or another non-transitory computer readable medium (not shown). The software can include firmware, one or more applications, program data, filters, rules, one or more program modules, and other executable instructions. The electronic processor 105 is configured to retrieve from the memory 110 and execute, among other things, software related to the control processes and methods described herein.

The memory 110 can include one or more non-transitory computer-readable media, and includes a program storage area and a data storage area. The program storage area and the data storage area can include combinations of different types of memory, as described herein. In the embodiment illustrated, the memory 110 stores, among other things, data and instructions for generating a graphical user interface (GUI) 112 (described in detail below).

The input/output interface 115 is configured to receive input and to provide output to peripherals. The input/output interface 115 obtains information and signals from, and provides information and signals to, (for example, over one or more wired and/or wireless connections) devices both internal and external to the electronic communications device 100.

The electronic processor 105 is configured to control the transceiver 120 to transmit and receive voice and other data to and from the electronic communications device 100. The electronic processor 105 encodes and decodes digital data sent and received by the transceiver 120, including audio communications. The transceiver 120 transmits and receives radio signals to and from various wireless communications networks. The electronic processor 105 and the transceiver 120 may include various digital and analog components, which for brevity are not described herein and which may be implemented in hardware, software, or a combination of both. Some embodiments include separate transmitting and receiving components, for example, a transmitter and a receiver, instead of a combined transceiver 120.

The electronic communications device 100 implements the graphical user interface 112, generated by the electronic processor 105, from instructions and data stored in the memory 110, and presented on the touch screen display 125. The touch screen display 125 is a suitable touch-sensitive interface display such as, for example, a liquid crystal display (LCD) touch screen, or an organic light-emitting diode (OLED) touch screen. The touch screen display 125 displays output and receives user input using detected physical contact (for example, via detected capacitance or resistance) via the pressure sensor array 130. The pressure sensor array 130 (described in detail below) includes a plurality of pressure sensors (FIG. 2), each of which is configured to measure a stress tensor and the directional component and magnitude of pressure/stress (for example, corresponding to a user input on the display 125). The pressure sensor array 130 may include a stress sensitive coating applied and patterned, for example, on the back of the display 125 or inside of a housing (not shown) of the device 100.

In some embodiments, the electronic communications device 100 is a smart telephone. In other embodiments, the electronic communications device 100 may be a tablet computer, a smart watch, or another portable or mobile electronic device containing software and hardware enabling it to operate as described herein.

Figure 2:
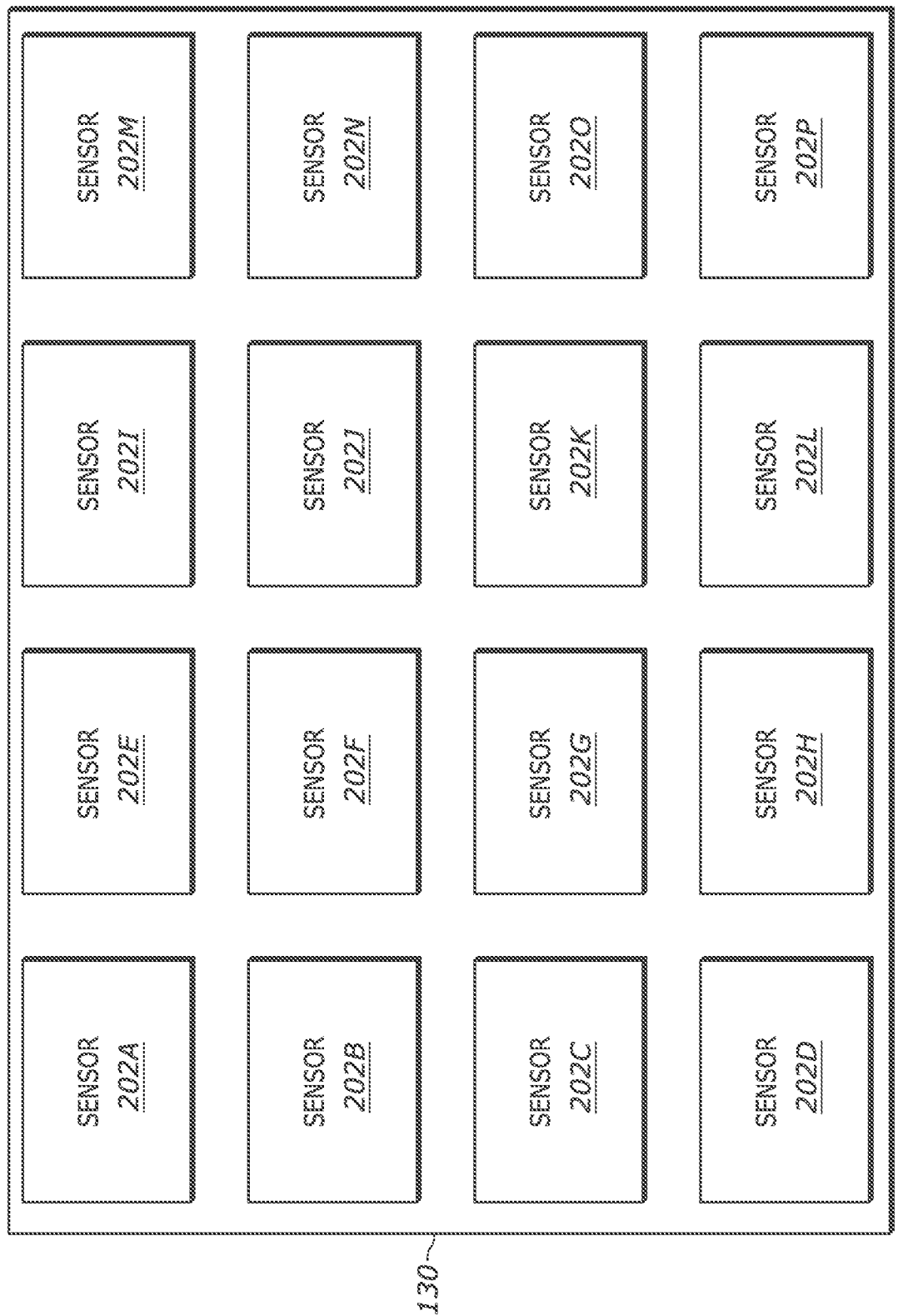
FIG. 2 is a pressure sensor array of the electronic communication device of FIG. 1 in accordance with some embodiments.

FIG. 2 illustrates a diagram of the pressure sensor array 130 in accordance with some embodiments. The pressure sensor array 130 includes a plurality of sensors 202A-202P arranged as a grid across a horizontal plane parallel to the display 125. The pressure sensors 202A-202P may each be any kind of suitable pressure sensor configured to measure strain, deflection, and/or stress, or some combination of sensors thereof.

Each of the plurality of sensors 202A-202P is read by the electronic processor 105. In some embodiments, the electronic processor 105 combines the measurements to determine a pressure/stress gradient map corresponding to the estimated amount of pressure applied across the display 125. Based on the gradient map, the processor 105 determines an origin point/area of direct pressure and the amount of pressure applied at the origin. The size, number, and/or density of sensors is selected such that the spatial resolution is sufficient enough to pinpoint the origin of a pressure contact on the display 125 as well to detect incidents where there are more than one source of the pressure contact. Thus, the spatial resolution is such that a pressure contact need only to be estimated based on readings from any sensors 202A-202B proximate to the contact point rather than directly beneath the contact point. This allows for less sensors 202A-202P to be utilized in the pressure sensor array 130 and therefore may reduce overall manufacturing cost and/or wiring complexity.

Additionally, as described in more detail below, the harsh grid configuration of the pressure sensor array 130 allows for detection (and compensation) in the case of a faulty pressure sensor. Where the distribution of sensors 202A-202P is fine enough, readings from the failed sensor may be ignored while the remaining sensors 202A-202P may approximate the location of the event.

Figure 3:
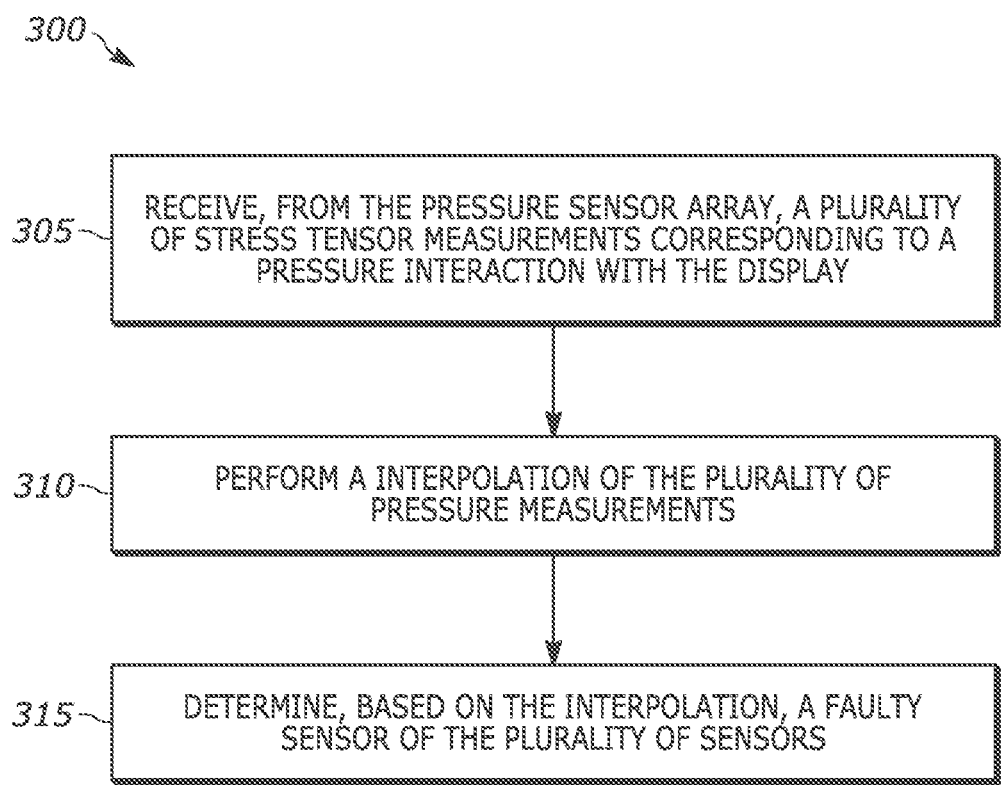
FIG. 3 is a flowchart of a method for determining a faulty sensor of the sensor array of FIG. 2 in accordance with some embodiments.

FIG. 3 is flowchart illustrating a method 300 of determining a faulty sensor of the pressure sensor array 130 in accordance with some embodiments. The method 300 is described as being performed by the electronic communications device 100 and, in particular, the electronic processor 105 and in terms of sensors 202A-202P. However, the methods described herein are applicable to any number of pressure sensors of the pressure sensor array 130 and may be implemented on or with multiple electronic processors.

At block 305, the electronic processor 105 receive, from the pressure sensor array 130, a plurality of stress tensor measurements corresponding to a pressure interaction (for example, a user touch input) with the display 125 and, at block 310, performs an interpolation of the plurality of pressure measurements. Based on the results of the interpolation, the processor 105 determines a faulty sensor of the plurality of sensors 202A-202P.

For example, the processor 105 may interpolate an estimated pressure value from one of the pressure sensors 202A-202P based on at least two pressure measurements from pressure sensors 202A-202P proximate to the pressure sensor being tested. The estimated pressure value may be compared to the actual pressure measurement measured by the pressure sensor being tested. When a difference between the estimated pressure value and the actual pressure measurement exceeds a predetermined error threshold, the tested pressure sensor is determined to be faulty. When a faulty pressure sensor is determined in the pressure sensor array 130, the processor 105 may ignore the measurements from the faulty sensor in the determination of the origin of the pressure interaction on the display 125 (for example, in the determination of the pressure gradient map).

Figure 4:
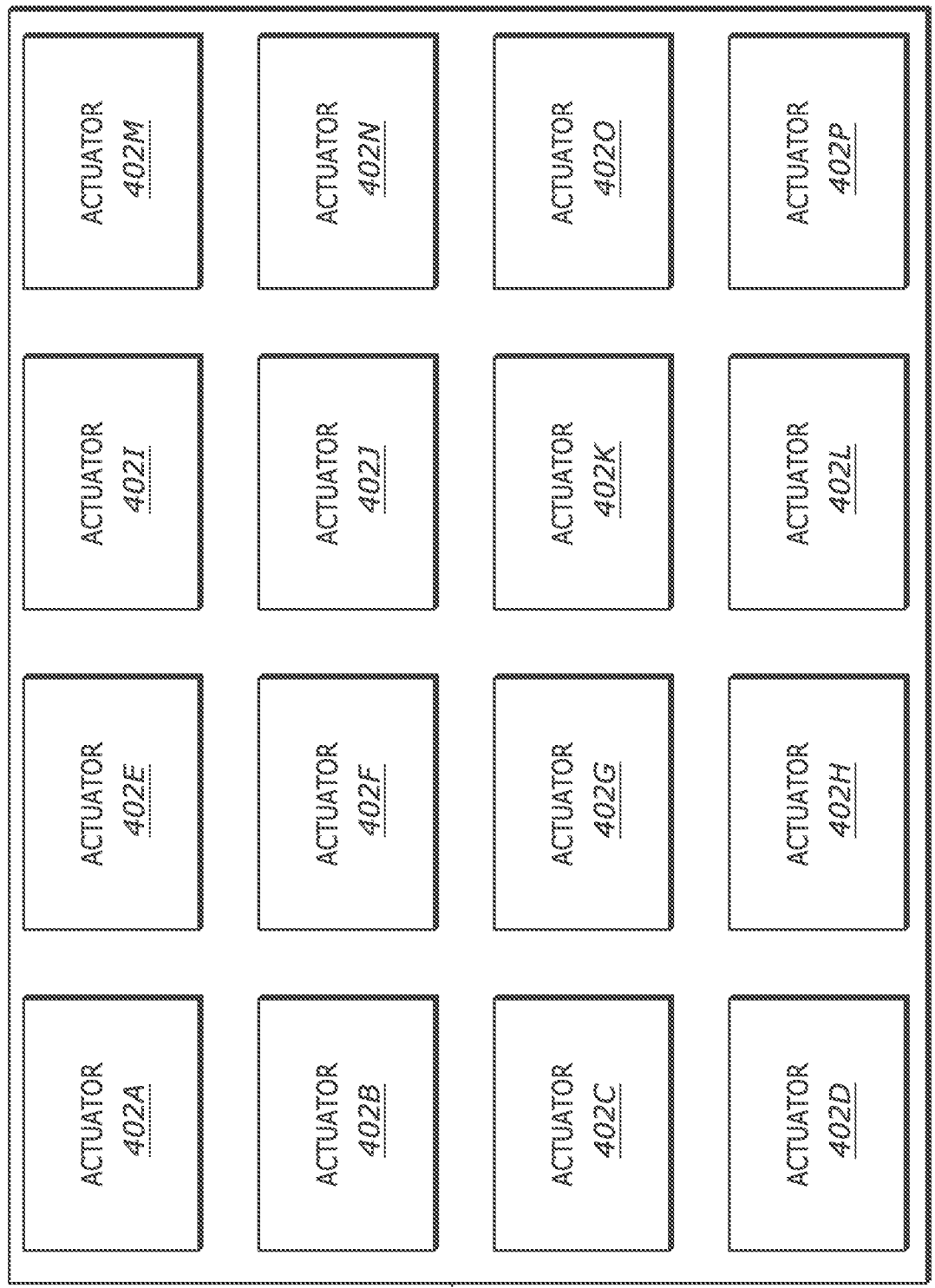
FIG. 4 is an actuator array of the electronic communication device of FIG. 1 in accordance with some embodiments.

Returning to FIG. 1, as mentioned above, in some embodiments includes one or more actuators 135 configured to provide vibration/haptic feedback. The actuator 135 may be any kind of suitable actuator including, but not limited to an electroactive polymer layer, a piezoelectric actuator, and the like. As shown in FIG. 4, in some embodiments, the actuators 135 may be an array of actuators including a grid of multiple actuators 404A-404P (similar to the configuration of the pressure sensor array 130 of FIG. 2). Such actuators may be, for example, individual electroactive polymer segments, of which the processor 105 is configured to individually activate each of by applying an electrical signal to the respective segment. The actuator 135 may be disposed directly above, below, and/or integrated into the pressure sensor array 130 within the device 100.

In some embodiments, the processor 105 is configured to, following determining an amount of pressure applied to the display 130 based on the plurality of stress tensor measurements, provide, via the actuator 135, a haptic force while the processor receives the plurality of stress tensor measurements, a magnitude of the haptic force being based on the amount of pressure. For example, the haptic force may be such that to counter and/or cancel the amount of pressure read by the sensors 202A-202P of the pressure sensor array 130. Since the actuators 402A-402P are individually controllable, the processor 105, in some embodiments, activates the actuators 402A-402P so as to produce more haptic feedback in one area of the display 125 and/or less feedback in another separate area of the display 125.

In some embodiments, the communication device 100 further includes accelerometer 140 (FIG. 1). The accelerometer 140 is configured to measure a movement and/or vibration experienced by the device 100. The electronic processor 105 may be further configured to, in such embodiments, determine, based on a measurement from the accelerometer 140, a haptic noise level (background noise vibration experienced by the device 100) and provide, via the actuator 135, a haptic force while (during) the processor 105 receives the plurality of stress tensor measurements. The haptic noise level is any sort of background noise vibration the device 100 experiences. The haptic noise level may affect the measurements from the pressure sensor array 130. For example, when a user is using the device 100 in a moving car, any sort of movement the car experiences due to a condition of the road (for example, when driving on rough terrain), the device will also experience. This may affect pressure readings from the pressure sensor array 130. Thus, by providing a haptic force to counter the motion effects of the vehicle, the pressure sensor array 130 is able to more accurately detect and measure a pressure contact on the display 125. The magnitude of the haptic force provided by the actuators 135 may be based on the haptic noise level. In some embodiments, the magnitude of the haptic force is such that as to reduce or cancel the haptic noise level experienced by the device 100.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable electronic communication device comprising:
    a display;

a pressure sensor array including a plurality of pressure sensors; and an electronic processor communicatively coupled to the pressure sensor array, the electronic processor configured to receive, from the pressure sensor array, a plurality of stress tensor measurements corresponding to a user interaction with the display;

perform an interpolation of the plurality of pressure measurements; and determine, based on the interpolation, a faulty sensor of the plurality of sensors wherein the determining the faulty sensor includes interpolating an estimated pressure value of a first pressure sensor based on at least two pressure measurements from at least two pressure sensors proximate to the first pressure sensor being tested, comparing the estimated pressure value to an actual pressure measurement measured by the first pressure sensor, and determining that the first pressure sensor is faulty when a difference between the estimated pressure value and the actual pressure measurement exceeds a predetermined error threshold.

2. The communication device of claim 1 further comprising an accelerometer and an actuator and wherein the electronic processor is further configured to determine, from a measurement from the accelerometer, a haptic noise level and provide, via the actuator, a haptic force while the processor receives the plurality of stress tensor measurements, a magnitude of the haptic force being based on the haptic noise level.

3. The communication device of claim 1 further comprising an actuator and wherein the electronic processor is further configured to determine an amount of pressure applied to the display based on the plurality of stress tensor measurements and provide, via the actuator, a haptic force while the processor receives the plurality of stress tensor measurements, a magnitude of the haptic force being based on the amount of pressure.

4. The communication device of claim 3, wherein the actuator is an electroactive polymer layer.

5. The communication device of claim 4, wherein the electroactive polymer layer includes an array of electroactive polymer segments and wherein the processor is further configured to individually actuate each of the electroactive polymer segments.

6. A method of determining a faulty sensor of a plurality of pressure sensors of a pressure sensor array, the method comprising:

receiving, from a pressure sensor array, a plurality of stress tensor measurements corresponding to a pressure interaction with a display;

performing an interpolation of the plurality of pressure measurements; and determining, based on the interpolation, a faulty sensor of the plurality of sensors wherein the determining the faulty sensor includes interpolating an estimated pressure value of a first pressure sensor based on at least two pressure measurements from at least two pressure sensors proximate to the first pressure sensor being tested, comparing the estimated pressure value to an actual pressure measurement measured by the first pressure sensor, and determining that the first pressure sensor is faulty when a difference between the estimated pressure value and the actual pressure measurement exceeds a predetermined error threshold.

7. The method of claim 6, the method further comprising determining, from a measurement from an accelerometer, a haptic noise level and providing, via an actuator, a haptic force during the receiving of the plurality of stress tensor measurements, a magnitude of the haptic force being based on the haptic noise level.

8. The method of claim 6, the method further comprising determining an amount of pressure applied to a display based on the plurality of stress tensor measurements and providing, via an actuator, a haptic force while the processor receives the plurality of stress tensor measurements, a magnitude of the haptic force being based on the amount of pressure.

9. The method of claim 8, wherein the actuator is an electroactive polymer layer.

10. The method of claim 9, wherein the electroactive polymer layer includes an array of electroactive polymer segments, each of which are actuated independently.

11. A portable electronic communication system comprising:

a display;

a pressure sensor array including a plurality of pressure sensors; and an electronic processor communicatively coupled to the pressure sensor array, the electronic processor configured to receive, from the pressure sensor array, a plurality of stress tensor measurements corresponding to a user interaction with the display;

perform an interpolation of the plurality of pressure measurements; and determine, based on the interpolation, a faulty sensor of the plurality of sensors wherein the determining the faulty sensor includes interpolating an estimated pressure value of a first pressure sensor based on at least two pressure measurements from at least two pressure sensors proximate to the first pressure sensor being tested, comparing the estimated pressure value to an actual pressure measurement measured by the first pressure sensor, and determining that the first pressure sensor is faulty when a difference between the estimated pressure value and the actual pressure measurement exceeds a predetermined error threshold.

12. The communication system of claim 11 further comprising an accelerometer and an actuator and wherein the electronic processor is further configured to determine, from a measurement from the accelerometer, a haptic noise level and provide, via the actuator, a haptic force while the processor receives the plurality of stress tensor measurements, a magnitude of the haptic force being based on the haptic noise level.

13. The communication system of claim 11 further comprising an actuator and wherein the electronic processor is further configured to determine an amount of pressure applied to the display based on the plurality of stress tensor measurements and provide, via the actuator, a haptic force while the processor receives the plurality of stress tensor measurements, a magnitude of the haptic force being based on the amount of pressure.

14. The communication system of claim 13, wherein the actuator is an electroactive polymer layer.

15. The communication system of claim 14, wherein the electroactive polymer layer includes an array of electroactive polymer segments and wherein the processor is further configured to individually actuate each of the electroactive polymer segments.

* * * * *